June 24, 1930. A. MOORE 1,766,670
CONVERSION VALVE
Original Filed Dec. 19, 1924 5 Sheets-Sheet 2
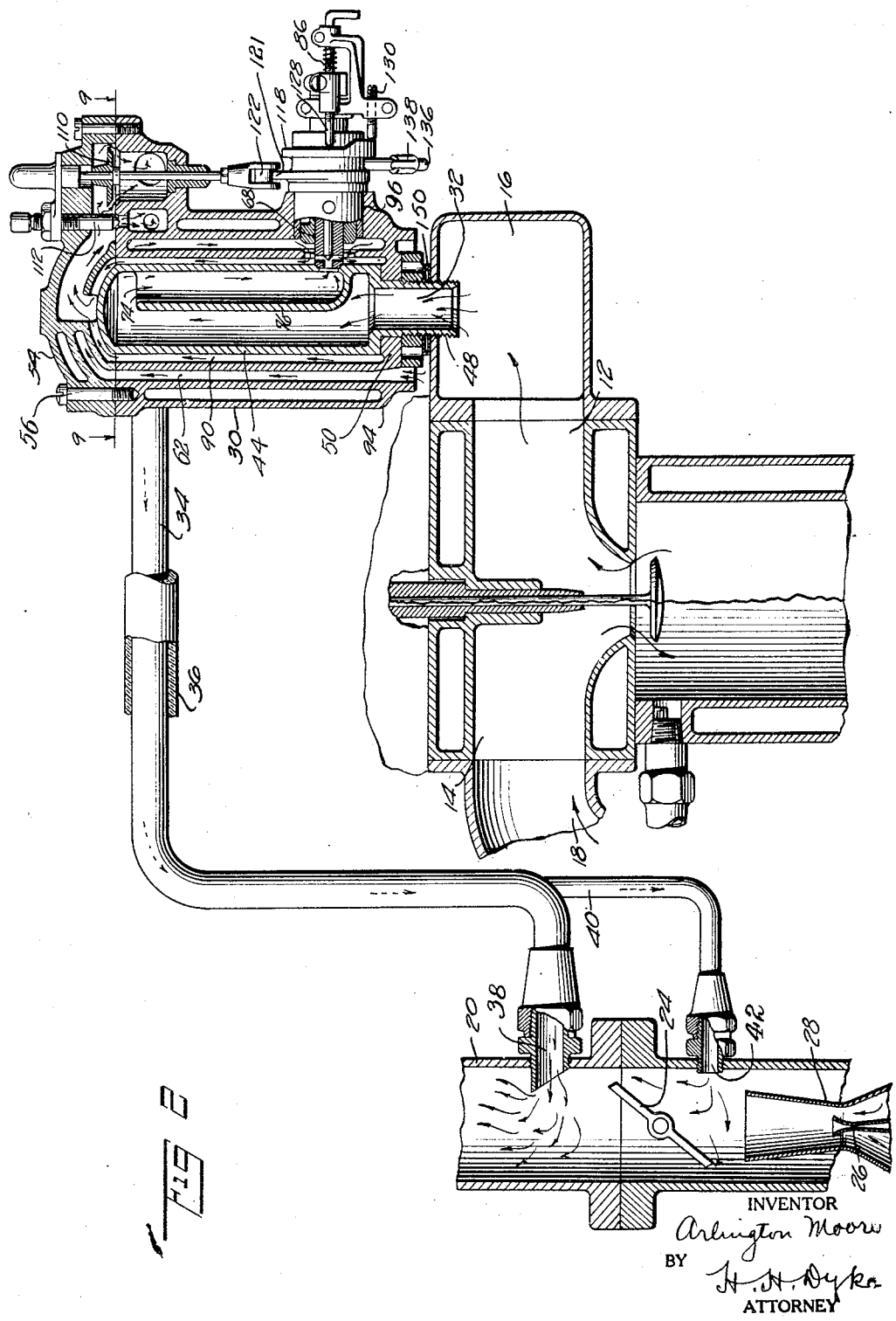
INVENTOR
Arlington Moore
BY H. H. Dyke
ATTORNEY

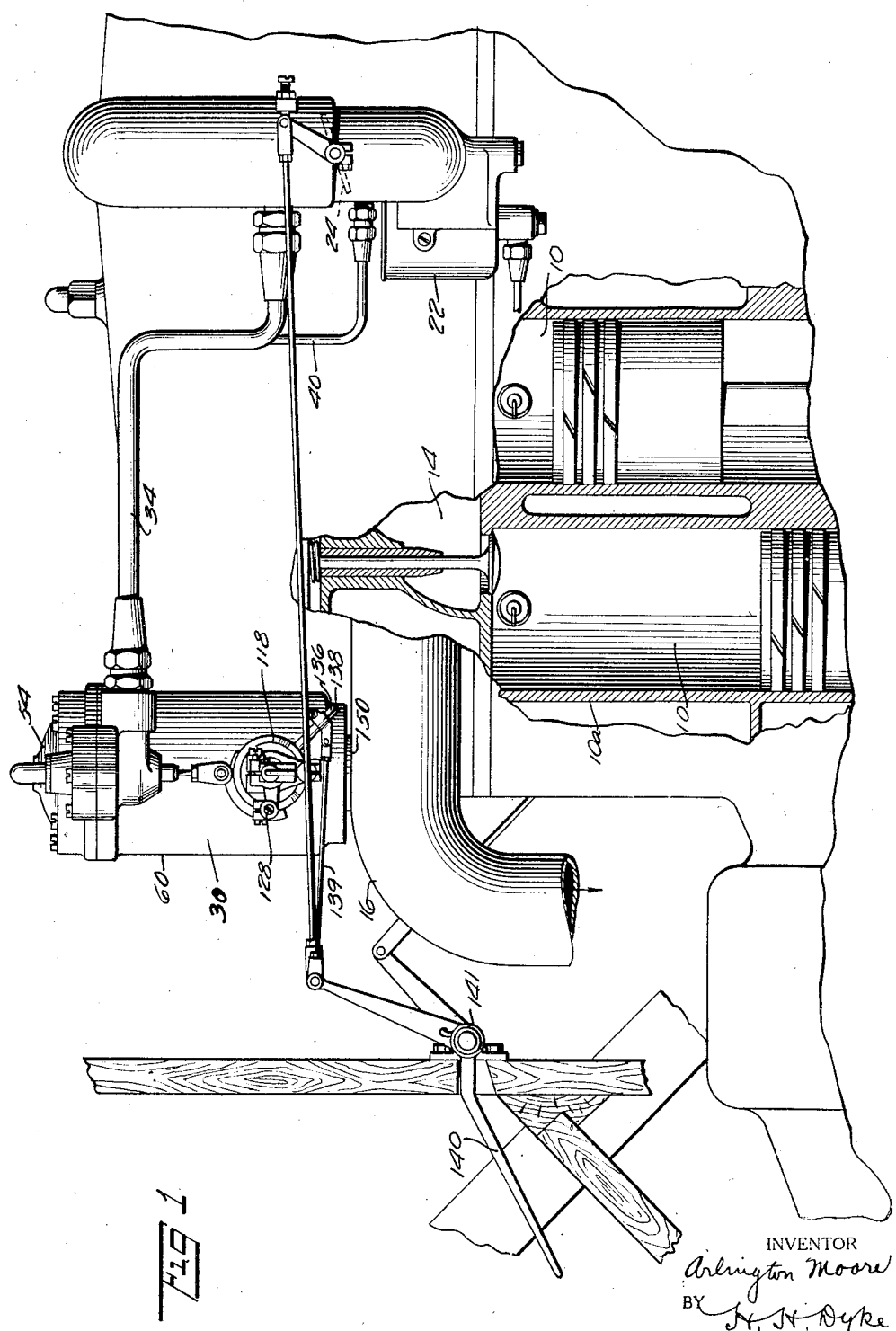

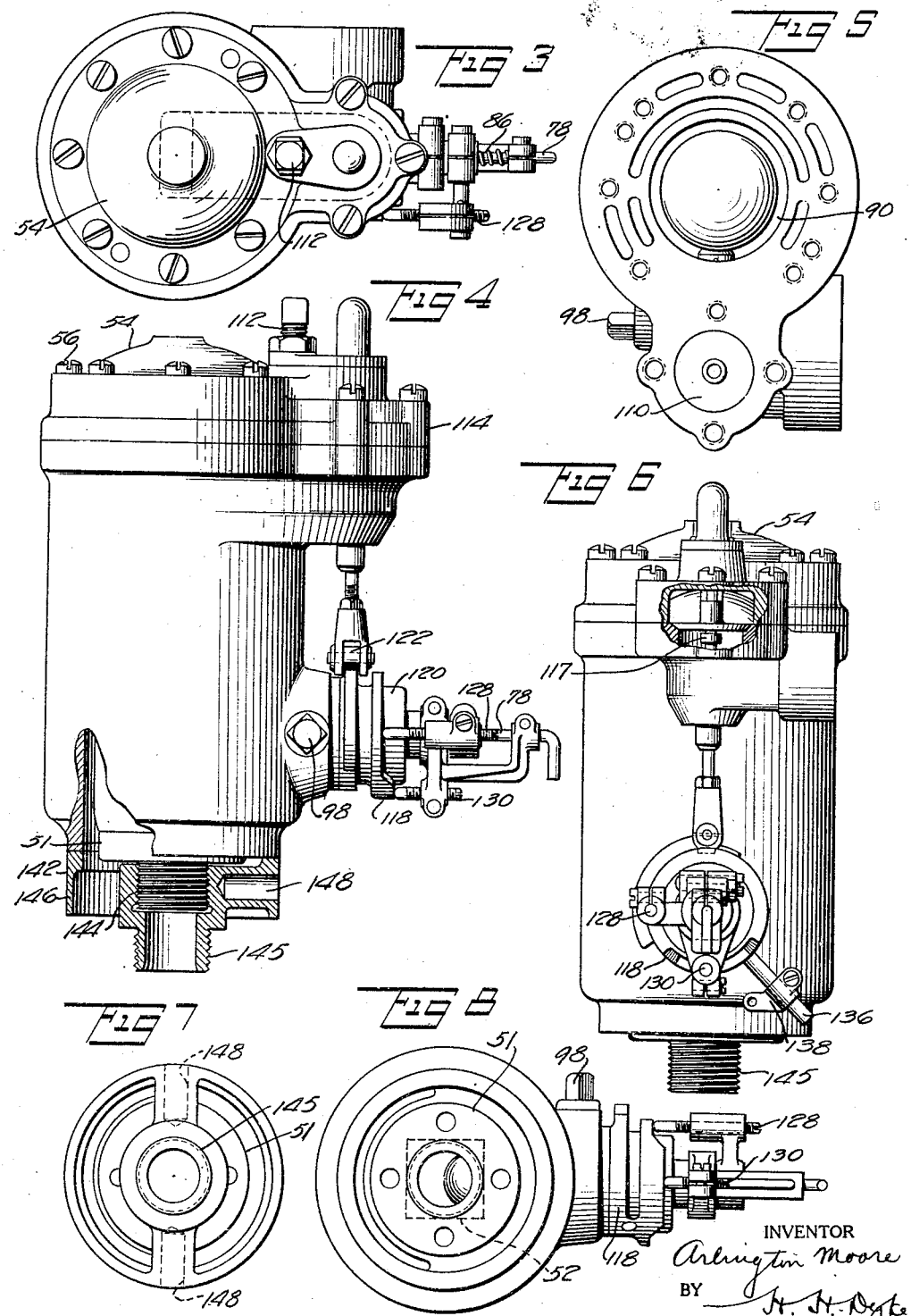

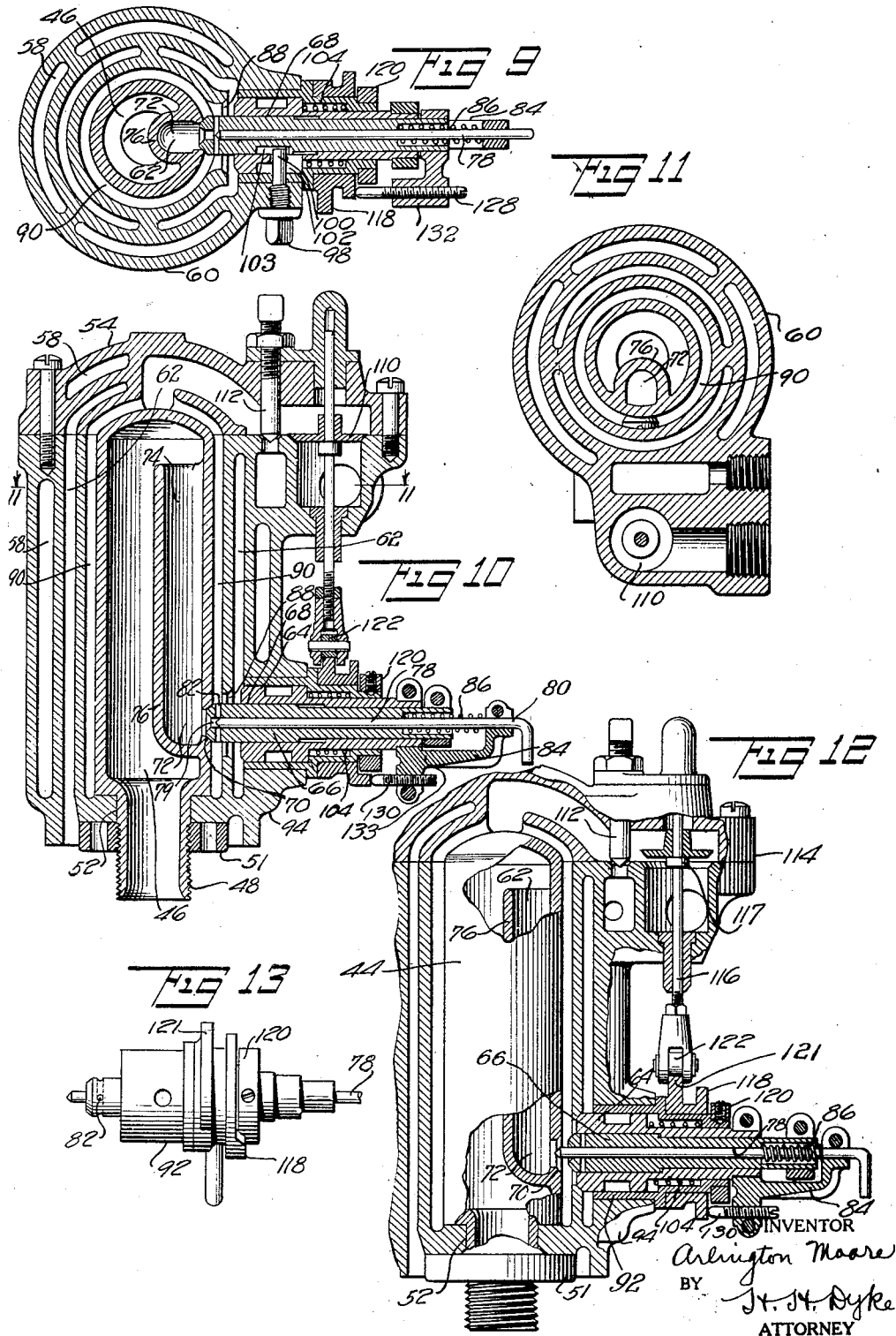

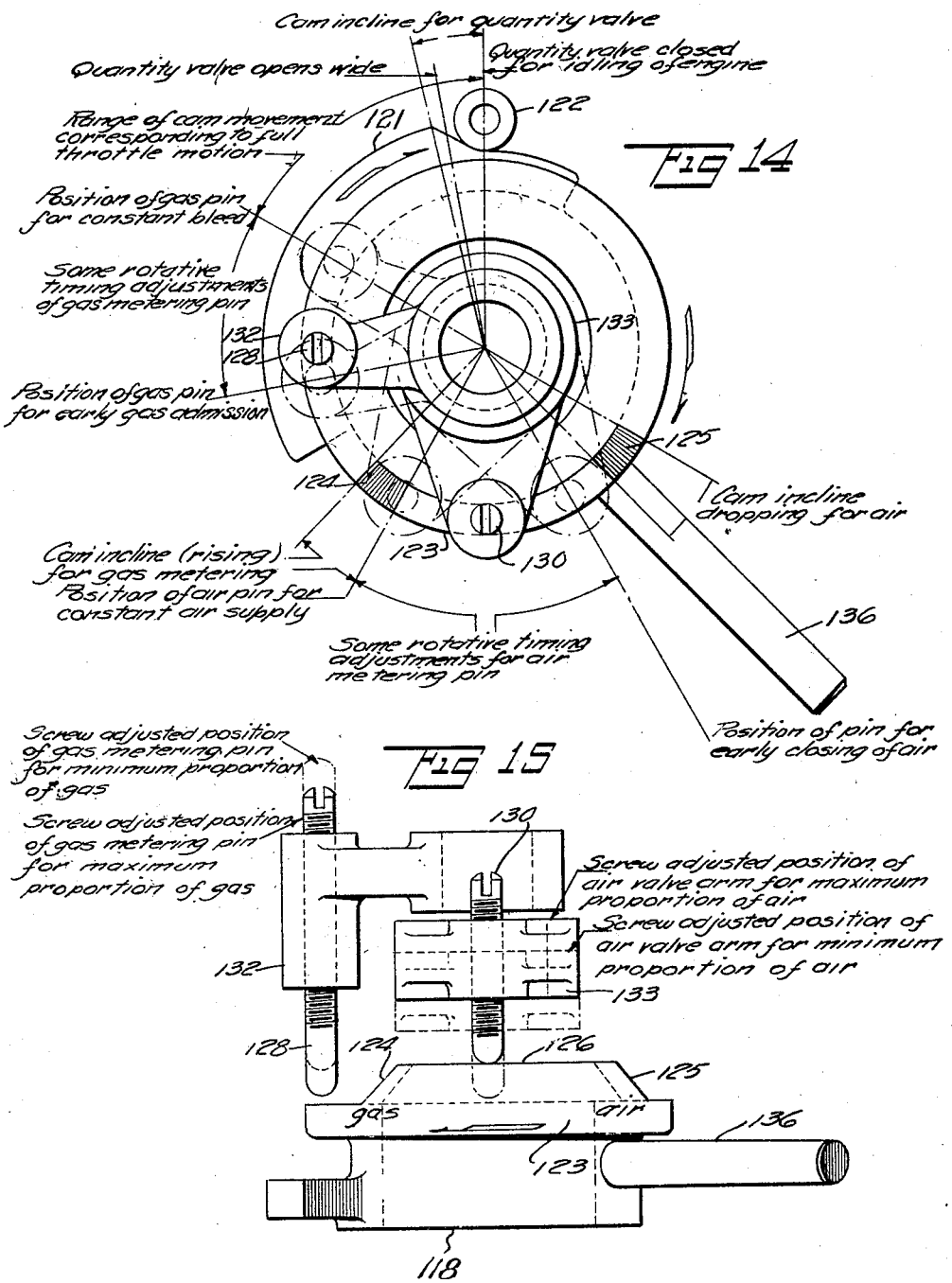

Patented June 24, 1930

1,766,670

UNITED STATES PATENT OFFICE

ARLINGTON MOORE, OF NEW YORK, N. Y., ASSIGNOR, BY MESNE ASSIGNMENTS, TO MAXMOOR CORPORATION, OF NEW YORK, N. Y., A CORPORATION OF DELAWARE

CONVERSION VALVE

Application filed December 19, 1924, Serial No. 757,075. Renewed October 23, 1929.

My invention is of a conversion valve device connected to the exhaust of an internal combustion engine of the Otto-cycle type and arranged to automatically deliver hot gases to the engine intake.

While the invention is not limited thereto, the embodiment herein illustrated and described in order to afford an understanding of the principles of the invention is designed to automatically correct the deficiencies commonly encountered in the ordinary automobile engine carburetor.

With apparatus embodying my invention there is delivered to the engine intake at partial throttle openings a mixture of hot air with some hot exhaust gas, these being accurately metered both for proportion and quantity and serving for promoting complete combustion and obtaining highly increased efficiency, while at and toward open throttle positions hot exhaust gas alone is delivered to the intake pipe for the purpose and with the result of eliminating or substantially eliminating detonation knocks in the engine.

Except at engine idling, the gases for modifying the mixture of air and fuel delivered by the carburetor are introduced into the intake above the throttle. For engine idling the modifying gases are introduced below the throttle, the relatively small orifice required for this purpose preferably remaining open for all throttle positions and engine loads. The metered supply of charge modifying gases is automatically controlled by interconnection of the metering devices with the engine throttle.

According to the present invention a small proportion of the hot exhaust gas is made use of in a novel and efficient manner for imparting very high heat to gas, principally air, delivered to the engine intake. A small proportion of hot exhaust gas is taken from the exhaust conduit through a suitable orifice and is mingled or mixed directly with the air to be delivered to the intake, the hot exhaust gas thus imparting its heat directly to such air. By reason of the high temperature of the exhaust gas the rise in the temperature of the air is quite marked, notwithstanding the proportion of exhaust gas is quite low.

The flow of exhaust gas and flame toward the orifice, provided for outlet of exhaust gas to be mixed with air as just described, is utilized for imparting further or augmented heat indirectly to the air. This is accomplished by providing a chambered heater of heat conducting material, such as copper, which is in connection at its inlet end with the interior of the exhaust manifold, and has a constricted valved outlet to the delivery passage to the intake pipe, thereby creating a draft from exhaust side to inlet side of the engine by reason of the pressure existing on the exhaust side and the suction or negative pressure on the intake side. The air, primarily heated by admixture of a small proportion of exhaust gas therewith, is further and more highly heated after such admixture of exhaust gas therewith by being caused to sweep over the extensive heated outer surface of the hot chambered heater, which, by reason of the draft above referred to, is effectively exposed on its interior to the exhaust flame close to the engine exhaust valves.

I also prefer to air jacket the conversion device and take its ingoing air from around the hot exhaust pipe and through the air jackets of the conversion device before adding exhaust gas for heating the air by indirect admixture therewith, followed by still further heating by the indirect application of heat as above described, thus securing an extremely effective utilization of the heat units available.

The highly heated gases supplied to the intake appear to give off all or substantially the greater part of their heat in the intake pipe or manifold in converting all parts of the gasoline-air mixture delivered by the carburetor to the intake pipe—and having much of the fuel in merely subdivided liquid form when delivered from the carburetor—into a highly vaporized dry gas, adapted when burned in the engine for giving practically complete combustion.

When detonation knocks occur in an internal combustion engine they are encountered at and toward open throttle. With a low compression engine, having a compression ratio of say 4½:1 such knocks ordinarily do not occur, except at practically full engine torque and hardly ever under ¾ torque. When the compression ratio is increased materially beyond about 4½:1, the tendency is to increase the range of torque at which detonation is encountered. I have found that when detonation engine knocking is encountered in an internal combustion engine, feeding of additional air has a tendency to increase the detonation knocking, but by feeding into the cylinder a suitable proportion of exhaust gas, the detonation which would otherwise occur is entirely or practically eliminated. I, therefore, make provision in my conversion device for reducing or cutting off the conversion device air, and also for introducing exhaust gas in more considerable proportions, at the throttle opening of any particular engine at which detonation knocking occurs without the use of the conversion device. The actual quantity of exhaust gas required, while considerably greater than that made use of at lower engine throttle openings for supplying heat as above noted, is nevertheless comparatively small, since the maximum proportion of exhaust gas which can be incorporated in the engine charge without making the charge substantially incombustible is relatively low, being apparently somewhere in the neighborhood of .20–25%. At no time does the valved passage of the conversion device for inlet of exhaust gas exceed in section about 10% of the intake pipe opening at the throttle. Apparently the gaseous materials coming from the carburetor and from the conversion device are admitted to the intake pipe in about the same ratio as the relative size of passages provided therefor, since with the throttle open or nearly so, the suction is substantially balanced below and above the throttle. Ample adjustments are provided, however, so that the quantity of exhaust gas fed to prevent detonation can be readily metered to suit the requirements of the engine, that is to say, so that the detonation is overcome without undue dilution of the mixture with an excessive proportion of exhaust gas.

As in the case of the hot mixture of air with a small percentage of exhaust gas admitted at partial throttle openings, such small quantity of hot exhaust gas with little or no air, used to eliminate detonation, appears to give up all or practically all of its heat direct to the more or less wet gasoline-air mixture delivered by the carburetor. While I am not to be limited by or confined to any particular theory or explanation of how detonation knocks are prevented, it would appear that by admitting the exhaust gas to the intake in fairly substantial quantities only at times when detonation is found to occur otherwise, two functions are accomplished; first, by giving their heat to the mixture delivered by the carburetor, they convert same into a state of dry gas and are themselves cooled, and when they in turn form a part of the compressed and ignited charge in the engine cylinder the exhaust gases serve to regulate combustion, whether by reason of their capacity to absorb heat due to their greater average density and particularly that of the $CO_2$ present, or from other causes, so that in any event they serve to keep the speed of flame propagation below that productive of the harmful and destructive phenomena known as detonation knocking.

The hot gases are for the most part delivered to the intake just over the throttle valve where the greatest suction and, therefore, the highest gas draft and heat production are obtained at partial throttle openings. I also provide adjustable means for injecting below the throttle a small proportion of the highly heated conversion device gases. This injection of hot gases below the throttle is preferably continuous during engine operation and when the bigger outlet from the conversion device to the intake pipe over the throttle is open, this extra inlet under the throttle serves merely to complement the effect of the bigger jet above the throttle in its action, which includes converting the wet or moist gasoline and air mixture delivered by the carburetor into a dry gas. By shutting off the connection from the conversion device to the inlet pipe above the engine throttle at nearly closed or idling positions of the engine throttle, the hot gas jet under the throttle is the only one of the two left in operation at such idling position of the throttle. The hot gases delivered at this point serve to gasify the fuel mixture when the engine is idling with the throttle only very slightly open, eliminating the necessity for the usual rich idling mixture and making it possible to idle the engine without the production of large quantities of the deadly CO gas, heretofore present in dangerously high degree in the exhaust of an engine when running idly.

In the drawings I have shown certain embodiments of the invention, but it is to be understood that same are for illustration only and for affording an understanding of the invention, and not for limitation thereof.

In said drawings, Fig. 1 is a side view with parts broken away showing an automobile engine equipped with a conversion device embodying my invention and having actuating mechanism interconnected with the engine throttle. Fig. 2 is a sectional view illustrating the application of the conversion device to a somewhat different type of engine, the conversion device parts being in position corresponding to partly opened positions of the engine throttle. Fig. 3 is a plan view of the conversion device. Fig. 4 is a side elevational view. Fig. 5 is a plan view with the dome casting removed. Fig. 6 is an elevational view at right angles to Fig. 4. Fig. 7 is a bottom view of the skirted union for connecting the conversion device to the exhaust manifold in locations where the valve cannot be rotated so as to be screwed bodily into place. Fig. 8 is a bottom plan view of the conversion device with the skirted union of Fig. 7 removed. Fig. 9 is a horizontal section on line 9—9 of Fig. 2, with the parts in the same position as in Fig. 2. Fig. 10 is a vertical sectional view of the conversion device parts in the position corresponding to the idling position of the engine throttle. Fig. 11 is a section on line 11—11, Fig. 10. Fig. 12 is a view similar to Fig. 10 and showing the conversion device parts in position to admit exhaust gas to the internal combustion engine at wide open throttle positions for preventing detonation. Fig. 13 is an elevation of the exhaust gas valve and air valve assembly removed bodily from the remainder of the conversion device. Fig. 14 is a side view of the cam member which operates the valves of the conversion device and also a timing chart. Fig. 15 is a bottom view of the cam member which operates the valves of the conversion device, and showing various adjusted positions of the cam follower pins for imparting movement from the cam to the proportioning valves of the conversion device.

Reference numeral 10 designates one of the cylinders of an internal combustion engine of the Otto-cycle type, 12 a portion of the exhaust passage, 14 a portion of the cylinder intake passage, 16 the exhaust manifold, 18 the intake manifold, 20 the intake pipe, and 22 the carburetor, shown in part and including the engine butterfly throttle 24, fuel supply jet 26 and Venturi tube 28 of one form of commercial carburetor which is in extensive use in internal combustion engines. The conversion valve or device 30 is connected to the exhaust manifold 16 immediately opposite or just in the rear of the last cylinder 10ᵃ and communicates therewith through a wide open port 32. Numeral 34 designates the main delivery pipe of the conversion valve, preferably heat insulation jacketed, as shown at 36, and communicating with the intake pipe 20 just above the engine throttle 24 through the cross jet outlet 38. Delivery of gases to the intake pipe between the engine cylinders and the engine throttle is referred to in my claims as "beyond" the throttle. Numeral 40 designates the auxiliary delivery pipe from the conversion device communicating with the intake pipe (or its continuation in the upper part of the carburetor) immediately below the throttle 24 through the cross jet outlet 42.

The conversion device 30 as herein shown is constructed in three principal parts, preferably made as castings: the chambered heater 44, preferably of copper or other equally good heat conducting material hollow on its interior, as shown at 46, and having a threaded neck 48 to be screwed into the exhaust manifold and containing the exhaust gas port 32 communicating with the chamber 46; the body member 50 having a preferably square hole 52 broached in its base for receiving the similarly shaped neck 48 of the heater 44 and holding same against relative turning movement, when locked in place by the nut 51; and the dome member 54 secured to the body member 50 as by screws 56.

Body member 50 and dome member 54 are preferably provided adjacent to their outer surfaces with air pockets 58 cored out of the casting and serving for insulation to prevent or reduce heat radiation losses from the outer surfaces 60, which are preferably smooth metallic surfaces and are desirably nickel plated to give a pleasing appearance.

In order to heat the incoming air it is led off the exhaust pipe into and through cored passages 62 provided in the body member 50 and dome member 54.

The incoming air and the small proportion of hot exhaust gas are thoroughly mixed by being brought together when moving in opposite directions. In the form shown this is accomplished by making the air valve 64 of sleeve formation and mounting the exhaust gas valve 66 to slide in the bore 68 of air valve 64.

The exhaust gas valve 66 controls the degree of opening of the valve seat or port 70 in the outer wall of heater 44. This port 70 is preferably placed at the bottom of a well 72 extending downwardly in the chamber 46 of heater 40 and communicating at the inlet 74 at its upper end with the principal portion of chamber 46 within the heater. In this way by causing the exhaust gases and flame drawn and forced into the heater chamber 46 to travel over and down beyond the baffle wall 76 separating the valved or vented well 72 from the principal part 46 of the hollow interior of heater 44, the heater walls are highly heated throughout the length and the greater part of the circumference of the heater member 44 so as to be well adapted to supply heat to gases sweeping over its outer surface, and by the time exhaust gas passes port 70, while still very hot, it is free from flame.

During the greater part of engine operation it is sufficient to provide merely a bleeding opening for the small quantity of exhaust gas made use of and it is then unnecessary to unseat the exhaust gas valve 66. Such bleeding opening may be provided in other ways, but I prefer to make same both adjustable and self-cleaning by providing the exhaust gas valve 66 with a bore 78 for reception of a metering pin 80 and having a number of radial outlet openings 82. The projecting outer end of pin 80 in the form shown is adjustably clamped in a bracket 84 mounted on the sleeve air valve 64 and the bleeding exhaust gas outlet aperture 79 is automatically cleaned whenever the valve 66 is fully opened (see Fig. 12). Valve 66 is normally held closed by the comparatively light spring 86, which reacts against the bracket 84. The means for actuating the valve 66 against spring 86 are described below.

The sleeve air valve 64 controls the port 88 between air inlet passages 62 and the heating and mixing chamber 90 surrounding the heater 44 within the body member 50 and below the dome member 54. It will be seen that air entering such chamber 90 through air port 88 and exhaust gas entering same through exhaust gas port 70 or bleeding aperture 79 are traveling in practically opposite directions with the result that they are thoroughly mixed with a resulting averaging of temperature as soon as they pass their respective valves 64 and 66.

The sleeve air valve 64, which contains the exhaust gas valve as above described, is slidably mounted in a barrel 92, which is adapted to be inserted in a boss 94 formed on the body member 50 and having a bore 96. The barrel 92 is removably secured in place by the dowel screw 98, the shank 100 whereof passes through a slot 102 in sleeve air valve 64 and terminates in a shallow slot 103 cut in the side of exhaust valve 66 (see Fig. 9). In this way, valves 66 and 64 may move longitudinally and at the same time are prevented from turning and the valve assembly can be removed upon merely unscrewing screw 98. Spring 104, which is stronger than spring 86, serves to push the air valve 64 against or toward its seat 88.

Valves 64 and 66 (or the bleed in the latter) serve to proportion the air and gas entering mixing and heating chamber 90, wherein the hot mixture of air and exhaust gas is further and more highly heated by being swept closely over the hot walls of heater 44.

The quantity of such hot gas mixture delivered from chamber 90 to the intake above the engine throttle is controlled by the poppet valve 110 seating in the direction of hot gas flow toward the inlet side of the engine. Valve 110 may be moved toward its seat by gravity as shown or by other means including springs, and may be constructed separately from its stem, as shown, in order to insure getting a good seat.

I preferably also provide the needle valve 112 to permit delivery of a small quantity of hot gas from chamber 90 to the jet outlet 42 below the throttle in order to provide for supply of the needed heat when idling the engine, at which time poppet valve 110 is closed. Needle valve 112 can be readily adjusted and may be closed if desired.

By mounting valve 110 in a lateral extension 114 provided in the dome member 54 with its valve stem 116 extending downwardly, I am enabled to combine in a single cam member 118 the control of each of the valves 64, 66 and 110, and thereby in a simple manner secure accurate timing and complete control of their relative movements. Valve stem 116 is preferably turned down to leave the integral rest or stop portion 117 of somewhat larger diameter than the remainder of the stem 116 for supporting and positioning valve 110 thereon.

Said cam member 118 is mounted to turn on barrel 92 as a hub on its axle and is held in place by a collar 120. Cam member 118 has a peripheral cam surface 121, to coact with roller 122 on the stem 116 of valve 110. Member 118 also has a double ended lateral camming portion 123 comprising the gas incline 124 at one end, the air incline 125 at the other end and the intermediate preferably plane or dwell surface 126. Said camming portion indicated generally by reference numeral 123 serves by coaction with the distance or bearing screws or pins 128 and 130 to actuate the valves 64 and 66 respectively, the respective distance pins 128 and 130 being mounted in split arms 132 and 133 adjustably screw clamped to valves 64 and 66. As already stated, valves 64 and 66 are slidable but are held by dowel screw 98 against turning, which would interfere with their being accurately operated by the cam means described. It will be apparent that the timing of the slidable but non-rotatable valves 64 and 66 can be varied by loosening the arms 132 and 133, rotating them to any desired position and reclamping and the extent of opening can be adjusted by screwing in or out the distance pins 128 and 130 carried by arms 132 and 133. The ranges of timing adjustments are indicated in full and dotted line positions of arms 132 and 133 in the timing chart, Fig. 14, and some of the many possible adjustments for distance or extent of opening of the proportioning valves 64 and 66 are shown by full and dotted line positions of distance pins 128 and 130 in Fig. 15. It will be noted that pins 128 and 130 are prevented from touching the cam member beyond inclines 124 and 125 by reason of the valves 64 and 66 moving therewith having come against their seats.

Cam member 118 is herein shown connected to the accelerator pedal by a crank arm 136, adjustable pivot block 138 and link 139, so that it is automatically operated with movement of the engine throttle 24, operated, for example, by the accelerator pedal 140. When the operating member as pedal 140 has a return spring 141, same serves the same function for the conversion device and there is no occasion for supplying the latter with a separate spring for this purpose, though this may be done, if desired. By adjustment of block 138 and/or link 139 the arc of rotation of cam member 118 can be regulated as desired and the proper relation obtained between the cam member and throttle 24 so as to cause the poppet quantity valve 110 to open at the proper time.

In some engines in which accessibility is sacrificed to economy of space, it is not practical to construct my conversion valve device so that it may be screwed bodily into place on the exhaust manifold near to or opposite the exhaust of the last cylinder where it should be located to get the exhaust flame heat substantially direct from the engine exhaust. To take care of its installation on engines so constructed, I may provide a right and left screw threaded union 142 (Figs. 6 and 7) whose internally threaded portion 144 is screwed on to the socket member 48 at the same time that its exteriorly and oppositely screw threaded portion 145 is being screwed into the exhaust manifold. The flange or skirt 146 setting closely to the exhaust manifold serves to direct air from off the hot exhaust manifold into the inlet opening 62, and spanner holes 148 can be provided for screwing up the union. At the connection with the exhaust manifold a soft washer 150, as an asbestos and copper washer, for example, is preferably provided in order to secure a tight connection.

It will be apparent from the foregoing that my improved conversion valve device can be readily attached or built into any internal combustion engine, all that is required being the boring and tapping of the requisite holes, the screwing of the connections therein and the attachment of the link 139 in any convenient place, so that it is actuated automatically with the engine throttle. Once installed and properly adjusted, the conversion device operates automatically and requires no separate manual operation or special attention.

The device is capable of practically universal adjustment to meet varying conditions and a description of operation will be confined herein to its action in an ordinary automobile engine. The various settings can, of course, be standardized and set at the factory for the various makes of engines.

Where a bleeding aperture is made use of the exhaust gas valve 66 is left closed up to throttle openings where detonation may otherwise occur, that is to say, about ½ of full throttle openings in high compression engines and about 3/4 throttle opening for low compression engines. The bleeding opening can be adjusted by its metering pin so as on the one hand to secure the necessary draft to provide the needed heat, and on the other hand to prevent undue dilution. Usually it can be left open fully, being very small.

The air valve 64 is open for all partial throttle positions, being closed at about the same throttle positions that the exhaust valve 66 is being opened. Thus there is available for delivery to the intake at partial throttle openings highly heated air with a small proportion of exhaust gas, and at wide throttle openings additional hot exhaust gas with little or no air admixed therewith, the proportions being controlled by the air and exhaust gas valves.

The quantity of hot gas to be delivered—except for the small amount needed for idling which can be allowed to come through at all times—is controlled by the poppet valve 110. It is preferably set and the roller on its stem adjusted so that the opening of valve 110 is slightly behind the opening of the engine throttle, but so that as soon as the engine throttle is sufficiently open to get up a fair engine speed the valve 110 begins to open and remains open for all the further range of throttle opening up to full throttle opening. See Fig. 14.

There is thus provided at partial throttle openings, at which automobile engines are run for the greater part of their operation, gases carrying high heat and delivered directly to be mixed with the mixture supplied by the carburetor. The percentage of exhaust gas used at partial throttle openings is relatively very small and I have found that admission of exhaust gas in any considerable proportions at low throttle settings dilutes the mixture and interferes with production of power and causes the engine to stop, whereas with only enough exhaust gas admitted to, so to speak, break the seal between exhaust side and inlet side and produce the draft toward the latter, and the consequent high heating of the conversion device gases, very great improvement in engine operation is secured.

Gas analyses of the exhaust gas from internal combustion engines made with and without the conversion valve device show that by its use there is a great increase of $CO_2$ (indicative of complete combustion obtained) and practically complete elimination of $CO$.

The complete combustion secured is accompanied by a substantial increase in fuel economy and power, which is particularly notable at partial throttle openings; smooth, economical idling is obtained; and detonation is avoided, making possible the use of high compression engines without resort to expensive fuel dopes, and these and related results are secured automatically during the operation of the engine, without special attention or manual manipulation other than the ordinary actuation of the engine throttle.

Conversion valve devices of my invention are especially useful in all high compression engines and, while they find their widest application and most extensive use in automobile engines, they are also adapted for use with engines of many other kinds. In airplane practice, they entirely eliminate the need for the expensive and troublesome decompressors necessary at sea level in order that the airplane engine may develop needed power at high altitudes.

It is to be understood that I am not to be limited by the specific embodiments shown and described for affording an understanding of the invention nor by any theories or explanations herein contained, but solely by the appended claims, which are to be construed as covering all novelty over the prior art.

I claim:

1. In apparatus for converting into a state for efficient combustion the air and fuel mixture delivered by the carburetor of an internal combustion engine, means below the engine throttle for admitting highly heated gases including a small proportion of exhaust gas, means for admitting such mixture beyond the engine throttle, and means for shutting off the admission means above the throttle while leaving operative the admission means below the throttle.

2. In apparatus for converting into state for efficient combustion the mixture of fuel and air delivered by the carburetor of an internal combustion engine, valved means for mixing hot exhaust gas and air in metered proportions whereby the air is heated, means for imparting augmented heat to such mixture, and valved means for delivering such heated and reheated mixture in metered quantities to the intake pipe beyond the engine throttle.

3. In apparatus for converting into state for efficient combustion the fuel and air mixture delivered by the carburetor of an internal combustion engine comprising carburetor and intake and exhaust conduits, means for delivering to the intake conduit beyond the engine throttle a mixture of hot exhaust gas and hot air, and means automatically opening and closing with movement of the engine throttle for controlling the proportions of air and exhaust gas in such mixture and the quantity delivered to the intake conduit.

4. In apparatus for converting into state for efficient combustion the fuel and air mixture delivered by the carburetor of an internal combustion engine by admixture therewith of highly heated gases, means for mixing air and hot exhaust gas in metered proportions, means for delivering augmented heat to such proportioned mixture, and means interconnected with the proportioning means for admitting such hot mixture in metered quantities to the intake pipe beyond the engine throttle.

5. In apparatus for converting into state for efficient combustion the mixture of fuel and air delivered by the carburetor of an internal combustion engine comprising carburetor and intake and exhaust pipes, means for introducing a mixture of hot exhaust gas and hot air to the intake pipe beyond the throttle when the throttle is opened, and means for shutting off the air supply means only whereby exhaust gas alone is introduced when the throttle is further opened.

6. In apparatus for converting into state for efficient combustion in the engine the mixture of fuel and air delivered by the carburetor of an internal combustion engine comprising carburetor and intake and exhaust pipes, means for by-passing exhaust gas to the intake, and means comprising a cleaning pin for automatically keeping the by-pass free from clogging.

7. In apparatus for converting into state for efficient combustion in the engine the mixture of fuel and air delivered by the carburetor of an internal combustion engine comprising carburetor and intake and exhaust pipes, an exhaust gas valve between exhaust and inlet conduits and having a bleeding passage therein, and means brought into operation by moving the valve to and from its seat for keeping the bleeding passage in the valve free from clogging.

8. In apparatus for converting into state for efficient combustion in the engine the mixture of fuel and air delivered by the carburetor of an internal combustion engine comprising carburetor and intake and exhaust pipes, regulable means for admitting air and a percentage of exhaust gas to the intake, and means for opening the exhaust gas admission means while closing the air admission means, and vice versa.

9. In apparatus for converting into state for efficient combustion in the engine the mixture of fuel and air delivered by the carburetor of an internal combustion engine comprising carburetor and intake and exhaust pipes, an air valve of sleeve formation, an exhaust gas valve slidable in said valve, means of communication from said valves to the inlet conduit, and means including a single actuating member for moving said valves in opposite directions.

10. In apparatus for converting into state for efficient combustion in the engine the mixture of fuel and air delivered by the carburetor of an internal combustion engine comprising carburetor and intake and exhaust pipes, an air valve of sleeve formation, an exhaust valve slidable therein, means of connection from said valves to the inlet conduit, a quantity metering valve for the mixture of exhaust gas and air, and means for operating all three valves including a single cam member.

11. The combination with an internal combustion engine of the Otto type having a compression ratio in excess of $4\frac{1}{2}:1$ and comprising intake and exhaust, carburetor and throttle, of valved means for feeding exhaust gas from exhaust to intake beyond the throttle, and means interconnected with the engine throttle for automatically causing the said valved means to further open relatively abruptly with about one-half and greater openings of the engine throttle.

12. In apparatus for converting into state for efficient combustion in the engine the mixture of fuel and air delivered by the carburetor of an internal combustion engine comprising carburetor and intake and exhaust pipes, an air valve of sleeve formation, an exhaust valve slidable therein, means of connection from said valves to the inlet conduit, a quantity metering valve for the mixture of exhaust gas and air, and means for operating all three valves including a single rotatable member.

13. In apparatus for converting into state for efficient combustion in the engine the mixture of fuel and air delivered by the carburetor of an internal combustion engine comprising carburetor and intake and exhaust pipes, an air valve of sleeve formation, an exhaust gas valve slidable in said valve, means of communication from said valves to the inlet conduit, and means including a single actuating member for actuating said valves.

14. The combination with an internal combustion engine comprising intake and exhaust manifolds of a casing having therein a chambered heater with a circuitous passage formed therein, said chambered heater having a port leading into one end of the passage therein from the exhaust manifold and having at the other end of the passage a constricted outlet for exhaust gas leading into said casing, means for admitting air into the space about the heater, and means for delivering hot gases from the casing to the intake beyond the throttle.

15. The combination with an internal combustion engine comprising intake and exhaust manifolds of a casing, a chambered heater in said casing and spaced from the walls thereof, the chamber in said heater being in communication with the interior of the exhaust manifold and having the hot exhaust gas circulating therein, valved means for admitting air into the space in the casing about the heater, and valved means for delivering heated air from within said casing to the engine intake beyond the throttle.

16. In apparatus for modifying the fuel and air mixture delivered by the carburetor of an internal combustion engine, means for mixing air and exhaust gas, comprising valves for each of said gases, valved means for delivering said mixed gases to the engine intake, and a single operating member for all of said valves.

17. Apparatus for effecting beneficial modification of the fuel and air mixtures supplied by the carburetor of an internal combustion engine, which comprises means for mixing air and exhaust gas, and means for introducing the last named mixture into the engine intake partly above and partly below the engine throttle.

18. Apparatus for effecting beneficial modification of the fuel and air mixture supplied by the carburetor of an internal combustion engine, which comprises means for mixing air and exhaust gas, means for delivering a part of the last named mixture into the engine intake conduit below the throttle at idling and all other positions of the throttle, and means for introducing another part of said last named mixture into the engine conduit above the throttle at throttle positions other than for engine idling.

19. As a new article of manufacture, a conversion device adapted to be attached to an internal combustion engine as a self-contained, unitary accessory, and comprising a casing having a mixing chamber therein, said mixing chamber communicating respectively with the outer air, the engine exhaust conduit and the engine intake manifold or passage, the last named connection being located between the carburetor and the engine cylinder, valve means to control the air and exhaust gas communications to the chamber and the outlet therefrom to the engine intake, and means for operating said valve means adapted to be interconnected with the engine throttle.

20. As a new article of manufacture, a conversion device adapted to be attached to an internal combustion engine as a self-contained, unitary accessory, and comprising a casing having a hollow heater therein and a mixing chamber in the casing and about the heater, said mixing chamber communicating respectively with the outer air, with the engine exhaust pipe through the hollow heater, and with the engine intake passage above the throttle, valve means for proportional metering of the admission of exhaust gas and air to the chamber, valve means for quantity metering of the outlet from the chamber to the engine intake, and means for operating said valve means in consonance with the operation of the engine throttle.

21. Apparatus for modifying the charge material supplied by the carburetor of an internal combustion engine, comprising means for withdrawing a part of the exhaust gas from the exhaust gas conduit, means for admixing air with the exhaust gas in metered proportions whereby the air is heated by direct admixture of exhaust gas therewith, means for transfering heat indirectly from the exhaust gas to the mixture of exhaust gas and air, and means for delivering the mixture of exhaust gas and air in metered quantities to the engine intake above the throttle.

22. Apparatus in accordance with claim 21, in combination with means operated in association with throttle movement for controlling the proportion metering of exhaust gas and air and the quantity metering of the mixture of exhaust gas and air.

23. Apparatus for modifying the charge material supplied by the carburetor of an internal combustion engine, comprising means for taking a part of the exhaust gas from the exhaust gas conduit, means for admixing the exhaust gas with air in metered proportions, the air being directly heated by the admixture of exhaust gas therewith, and means for delivering the mixture of exhaust gas and air in metered quantities to the engine intake conduit over the throttle.

24. Apparatus in accordance with claim 23 in which the means for proportion metering of exhaust gas and air and the means for quantity metering of the mixture of exhaust gas and air are operated in association with movement of the engine throttle.

25. Apparatus for modifying the charge material supplied to an internal combustion engine by the carburetor, comprising a bypass from exhaust to intake above the throttle, and means for admitting air into the bypass and delivering it to the intake in admixture with the exhaust gas up to but not beyond a predetermined opening of the throttle.

26. Apparatus in accordance with claim 25, in which more exhaust gas is supplied through the by-pass after than before the cutting off of the air supply at a predetermined throttle opening.

27. In supplementing apparatus for internal combustion engines, means for metering air and exhaust gas into admixture and for remetering the mixture thereof and supplying same to the engine intake.

28. In an internal combustion engine, a bypass conduit from exhaust to intake, valved means for controlling the passage of exhaust gas to the intake, a port for the passage of said gas at idling, and means rendered operative upon opening of said valved means for closing said port.

29. In conversion apparatus for internal combustion engines comprising intake and exhaust manifolds and carburetor, means for introducing to the intake beyond the throttle highly heated air at partial throttle openings and for admitting gases of combustion thereto and shutting off the heated air supply at and toward open throttle positions.

30. An apparatus for modifying the charge material supplied to an internal combustion engine comprising a bypass from exhaust to intake, said bypass being continuously open to supply the exhaust gas to the intake throughout the load range of the engine, means for admitting air into the bypass and delivering the same to the intake in admixture with the exhaust gas, and means operated adjunctively to throttling and predetermined to close the air admitting means at certain throttle positions and to open the air admitting means at other throttle positions.

31. In apparatus for converting into state for efficient combustion in the engine the mixture of fuel and air delivered by the carburetor of an internal combustion engine comprising carburetor and intake and exhaust conduits, means for admitting air and exhaust gas to the intake beyond the throttle, and controlling means operated adjunctively to throttling and predetermined to vary the extent of opening of the exhaust gas admitting means and to open the air admitting means at certain of the openings of the exhaust gas admitting means and to close the air admitting means at other of the openings of said exhaust gas admitting means.

32. An apparatus for modifying the charge material supplied to an internal combustion engine comprising an exhaust, an intake, a throttle, a bypass from exhaust to intake, means for supplying air to said bypass, and throttle actuated means for controlling the passage of exhaust gas through said bypass throughout the load range and for closing said air admitting means over a portion of said load range.

33. In apparatus for modifying the charge material supplied to an internal combustion engine including exhaust, intake and throttle, comprising a heater having a passage for exhaust gas from said exhaust, an air conducting passage and a mixing chamber in communication with said passages and with said intake, and valvular means for controlling the passage of exhaust gas and heated air to said mixing chamber over the lower portion of the load range, and for controlling the passage of exhaust gas thereto over the higher portion of the load range while excluding heated air therefrom.

34. In an internal combustion engine, an exhaust, an intake, a throttle, means for supplying exhaust gas and air to the intake, common valvular means for severally controlling the passage of exhaust gas and air, and plural means adjustable independently of each other for predetermining the quantity of exhaust gas and air admitted by said valvular means at engine idling.

35. In an internal combustion engine having an engine intake and a throttle, means for admixing exhaust gas and air, movable valve means for controlling admission of the mixture of exhaust gas and air to the engine intake above the throttle, and an auxiliary outlet from said admixing means open at all times provided for admission of the mixture of air and exhaust gas to the intake.

36. In an internal combustion engine having an intake and throttle, means operative at engine idling for delivering exhaust gas and air in set proportions and quantities to the intake, and means coming into action at wider throttle openings and engine loads to effect a supplemental delivery of exhaust gas and air while continuing delivery of the set quantity for idling at such gases.

37. In an internal combustion engine, means for admixing exhaust gas and air, valve means for controlling admission of the mixture of exhaust gas and air to the engine, and auxiliary means for supplying a portion of said mixture to the intake when said valve means is closed.

38. In an internal combustion engine having exhaust and intake conduits, means for conducting exhaust gas from said exhaust conduit to said intake conduit, means for conducting air to said first named means, a pair of spring pressed valves disposed coaxially for controlling the passage of exhaust gas and air to the intake conduit, and members disposed symmetrically relative to the axis of the valves for controlling said valves.

39. In an internal combustion engine including exhaust and intake manifolds, a by-pass from the exhaust manifold to the intake manifold, and a valve for controlling said by-pass; said valve including an orifice serving to bleed exhaust gas when said valve is in closed position.

40. In an internal combustion engine including exhaust manifold, intake and throttle, a heater interposed between the exhaust manifold and the intake and having an exhaust gas passage therethrough to said intake and an air passage therein in thermal relation to said exhaust gas passage and communicating therewith, and means for controlling the passage of exhaust gas and heated air to said intake; said means including means for bleeding limited quantities of exhaust gas and air to the intake at idling.

41. In an internal combustion engine including exhaust manifold, intake and throttle, a by-pass from exhaust manifold to intake, valve means for controlling the admission of said exhaust gas to the intake, and means for bleeding exhaust gas to said intake when said valve means is closed.

In testimony whereof, I have signed my name hereto.

ARLINGTON MOORE.